J. B. Fink,
Pipe Coupling.
No. 111,187.    Patented Jan. 24, 1871.
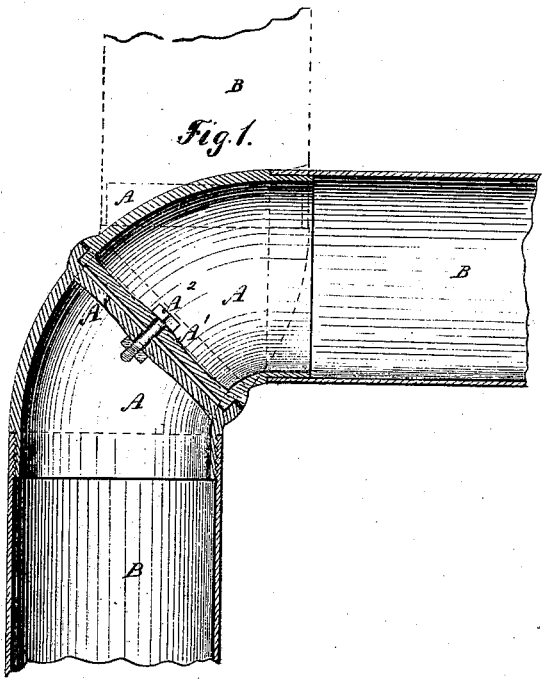
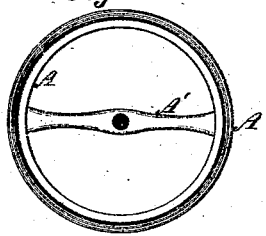
Witnesses
A. Ruppert
C. F. Clausen
J. B. Fink
Inventor
D. P. Holloway & Co
Att'y

United States Patent Office.

JOHN B. FINK, OF MECHANICSVILLE, PENNSYLVANIA.

Letters Patent No. 111,187, dated January 24, 1871.

IMPROVEMENT IN PIPE-COUPLINGS.

The Schedule referred to in these Letters Patent and making part of the same.

*To all whom it may concern:*

Be it known that I, JOHN B. FINK, of Mechanicsville, in the county of Lehigh and in the State of Pennsylvania, have invented a new and useful Improvement in Pipe-Couplings; and I do hereby declare the following to be a full, clear, and exact description of the same, reference being had to the accompanying drawing making a part of this specification, in which—

Figure 1 is a central sectional elevation of my improved coupling, showing also a section of pipe at each of its ends, to which it is attached.

Figure 2 is a transverse section, showing the cross-bar for receiving the bolt which secures the two parts to each other.

Corresponding letters of reference refer to corresponding parts in both of the figures.

This invention relates to that class of devices which are denominated elbow-couplings; and It consists in the means of securing the two portions of the elbow-joint to each other, as will be more fully explained hereinafter.

It has been a long-acknowledged desideratum to be able to connect an elbow in pipes used for water, steam, or any of the various kinds of gases, in such a manner that any desired angle could be obtained and at the same time not add to the cost of the joint to any considerable extent, and so as not to disfigure it by placing an unwieldy flange around it, as has previously been done.

The object of the present invention is to remove the objections above alluded to, and to furnish an elbow-joint which shall be capable of giving a direction to the material which passes through it such as may be desired, whether it be at a right angle or any other angle within the range of the device, and at the same time afford the means of firmly holding the parts in the desired position and of forming a tight joint between the parts.

To enable those skilled in the art to make and use my invention, I will proceed to describe it with reference to the drawing, in which—

A A refer to the two sections of an elbow-joint, which are so constructed as, when in the position shown in fig. 1, to cause the pipes B B, with which they are connected, to stand at right angles to each other, but which, by being turned in different directions or into different positions, may cause such pipes to assume almost any desired angle or position with reference to each other, and, consequently, give various directions to the water, steam, or other gases which may be passing through it.

The ends of this joint, which form the joint between the two parts, are each provided with flanges, one fitting within the other, as shown in fig. 1, so that, when the male portion of one enters the female portion of the other, no motion of the parts can take place except a rotary motion, which enables the parts to assume the different positions above alluded to.

When this joint is used in pipes in which any considerable amount of pressure is maintained, a packing of rubber or other suitable material is provided, so that the two parts may be made to press firmly upon it, so that no leakage can occur at that point. When, however, the joint is used for stove-pipes, the packing may be dispensed with.

The means which I employ for securing the parts of my joint to each other consist in bars of metal, $A^1$ $A^1$, which extend centrally across the interior of the sections at the points where they are joined together.

Through the centers of these bars holes are drilled for the reception of the bolt $A^2$, which is provided with a nut, as shown in fig. 1, for holding the parts in position, as above described.

The outer ends of the sections forming the elbow-joint may have a screw-thread upon them for the purpose of uniting the other pipes to, or they may be left smooth and be secured to the other pipes with cement.

I am aware that joints for pipes have been made which are capable of being placed at a variety of angles, and that in this respect mine resembles them; but I am not aware that any one of these has ever been provided with the means which I employ for making a tight joint between the two sections of the elbow.

Having thus described my invention,

What I claim, and desire to secure by Letters Patent, is—

A pipe-coupling or connection combining in its construction the two curved portions, A A, the cross-bars $A^1$ $A^1$, and the bolt $A^2$, the whole being constructed and arranged to operate substantially as and for the purpose set forth.

In testimony whereof I have signed my name to this specification in the presence of two subscribing witnesses.

JOHN B. FINK.

Witnesses:
B. EDW. J. EILS,
A. RUPPERT.